United States Patent
Oblizajek et al.

(10) Patent No.: US 7,347,437 B1
(45) Date of Patent: Mar. 25, 2008

(54) DAMPER ASSEMBLY

(75) Inventors: Kenneth L. Oblizajek, Troy, MI (US); Shawn G. Quinn, Grand Blanc, MI (US); William C. Gregory, Milford, MI (US); Carl T. Wright, Highland, MI (US); Gregory J. Fadler, Commerce Township, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 0 days.

(21) Appl. No.: 11/536,021

(22) Filed: Sep. 28, 2006

(51) Int. Cl.
B60G 13/14 (2006.01)

(52) U.S. Cl. .................. 280/124.155; 280/124.157; 267/136; 188/322.22

(58) Field of Classification Search .............. 280/5.5, 280/124.157, 124.16, 124.161, 124.158, 280/124.159, 124.146, 124.147, 124.154, 280/124.155, 5.515, 5.519; 267/140.13, 267/140.14, 220, 64.21; 188/304, 303, 280, 188/322.11
See application file for complete search history.

(56) References Cited

U.S. PATENT DOCUMENTS

| | | | | |
|---|---|---|---|---|
| 3,479,053 A * | 11/1969 | Moulton | | 280/104 |
| 3,966,223 A * | 6/1976 | Carr | | 280/124.128 |
| 4,460,168 A * | 7/1984 | Obadal | | 267/140.11 |
| 4,497,523 A * | 2/1985 | Lederman | | 384/615 |
| 4,618,127 A * | 10/1986 | Le Salver et al. | | 267/220 |
| 4,630,803 A * | 12/1986 | Werner et al. | | 267/219 |
| 4,641,817 A * | 2/1987 | Clark et al. | | 267/140.13 |
| 4,690,430 A * | 9/1987 | Buma | | 267/64.21 |
| 4,840,358 A * | 6/1989 | Hoying et al. | | 267/140.14 |
| 5,009,401 A * | 4/1991 | Weitzenhof | | 267/64.21 |
| 5,040,775 A * | 8/1991 | Miyakawa | | 267/220 |
| 5,186,440 A * | 2/1993 | Schobbe et al. | | 267/220 |
| 5,221,078 A * | 6/1993 | Hartel et al. | | 267/140.14 |
| 5,340,094 A * | 8/1994 | Schyboll et al. | | 267/219 |
| 5,344,127 A * | 9/1994 | Hettler et al. | | 267/140.13 |
| 6,010,120 A * | 1/2000 | Nagasawa | | 267/140.14 |
| 6,126,153 A * | 10/2000 | Hein et al. | | 267/140.13 |
| 6,224,045 B1 * | 5/2001 | Muramatsu et al. | | 267/140.13 |
| 6,250,658 B1 * | 6/2001 | Sakai | | 280/124.106 |
| 6,311,963 B1 * | 11/2001 | Suzuki et al. | | 267/140.13 |
| 6,352,144 B1 * | 3/2002 | Brooks | | 188/267.2 |
| 6,439,554 B1 * | 8/2002 | Takashima et al. | | 267/140.13 |
| 6,612,554 B1 * | 9/2003 | Linn | | 267/140.13 |
| 6,631,893 B2 * | 10/2003 | Hermann et al. | | 267/140.13 |
| 6,655,669 B1 * | 12/2003 | Jung | | 267/220 |
| 6,659,435 B2 * | 12/2003 | Yamaguchi et al. | | 267/140.12 |
| 6,669,182 B2 * | 12/2003 | Hibi et al. | | 267/140.13 |
| 6,685,175 B2 * | 2/2004 | Takashima et al. | | 267/140.13 |
| 6,691,989 B1 * | 2/2004 | Leonard | | 267/64.28 |
| 6,776,402 B2 * | 8/2004 | Miyamoto et al. | | 267/220 |
| 2001/0026038 A1 * | 10/2001 | Muramatsu et al. | | 267/140.11 |

(Continued)

FOREIGN PATENT DOCUMENTS

DE 3210731 A1 * 10/1983

Primary Examiner—Eric Culbreth
Assistant Examiner—Karen J. Amores (57) ABSTRACT

A damper assembly for a suspension system of a vehicle includes a housing adapted to be mounted to one end of a strut in the suspension system. The housing has a chamber with fluid therein. The damper assembly also includes at least one diaphragm extending across the chamber to react with the fluid, to be compliant at relatively small displacements, and to be rigid at relatively large displacements.

13 Claims, 8 Drawing Sheets

U.S. PATENT DOCUMENTS

2002/0145242 A1* 10/2002 Miyamoto et al. .......... 267/220
2003/0057620 A1* 3/2003 Muramatsu et al. ... 267/140.14
2003/0132560 A1* 7/2003 Yamaguchi et al. ... 267/140.12
2004/0012136 A1* 1/2004 Mennesson ................. 267/220
2004/0089989 A1* 5/2004 Tewani et al. ......... 267/140.13
2005/0046137 A1* 3/2005 Dreff ................... 280/124.157

* cited by examiner

DAMPER ASSEMBLY

TECHNICAL FIELD

The present invention relates generally to suspension systems for vehicles and, more particularly, to a damper assembly for a suspension system of a vehicle.

BACKGROUND OF THE INVENTION

It is known to provide a suspension system for a vehicle such as a motor vehicle. One form of the suspension system includes a coil spring, one end of which rests in a lower seat moving with the wheel assembly; the opposite end contacts an upper seat of a vehicle body or frame of the vehicle. The spring supports the weight of the vehicle body and allows for reciprocating relative movement between the wheel assembly and the vehicle body during road travel to isolate wheel disturbances from the vehicle body.

In another form of the suspension system, a strut is mounted between the movable suspension elements and the body of the vehicle. The strut typically includes a hydraulic cylinder with an attached piston and piston rod. The piston rod slidably extends from an upper end of the hydraulic cylinder and is connected to the vehicle body through a flexible connection. The hydraulic cylinder is attached to movable suspension members at its lower end. The impact of shocks from the road surface causes movement of the piston, in turn, displacing fluid contained in the hydraulic cylinder. The resistance of movement of the piston through the hydraulic cylinder is dependent on the rate of displacement, thereby damping the movement of the associated spring and preventing excessive bouncing.

As the wheel assembly of the vehicle encounters road inputs, the suspension system undergoes compression (jounce) and extension (rebound) strokes. Current dampers in strut type suspension systems, exhibit effects that suggest a strong influence of stiction. The damper carries a radial load induced by reaction of static and dynamic forces in the suspension. This radial load binds the damper rod and tube at the rod guide and piston interfaces. The bind results in a relatively stiff suspension member because the damper rod ceases to freely move within the tube, defeating the advantageous effects of the displacement of the internal fluid. Under such conditions, the damper readily transmits unsprung suspension displacement, virtually lossless (as if it were elastic). Dynamic forces at the reaction interfaces of the vehicle body are much larger than desired, ultimately producing disproportionately large accelerations of the sprung mass.

As a result, it is desirable to provide a new damper assembly for a suspension system of a vehicle that is in series with an existing damper of a vehicle. It is also desirable to provide a damper assembly for a suspension system of a vehicle that provides damping and is stiction free. It is further desirable to provide a damper assembly for a suspension system of a vehicle that simultaneously reacts the relatively large static, quasi-static, and dynamic radial and bending loads without binding the damper. Therefore, there is a need in the art to provide a damper assembly for a suspension system of a vehicle that meets at least one of these desires.

SUMMARY OF THE INVENTION

Accordingly, the present invention is a damper assembly for a suspension system of a vehicle. The damper assembly includes a housing adapted to be mounted to one end of a strut in the suspension system. The housing has a chamber with fluid therein. The damper assembly also includes at least one diaphragm extending across the chamber to react with the fluid, to be compliant at relatively small displacements, and to be rigid at relatively large displacements.

One advantage of the present invention is that a damper assembly is provided for a suspension system of a vehicle that is stiction free by using elastomeric or small displacement elastic members. Another advantage of the present invention is that the damper assembly provides hydraulic damping. Yet another advantage of the present invention is that the damper assembly uses elastomeric or elastic reactions under small displacements to simultaneously react the relatively large static radial and bending loads that usually bind a conventional damper. Still another advantage of the present invention is that the damper assembly acts in series with the existing damper for low amplitude dynamic displacements, providing relatively low impedance and required damping. A further advantage of the present invention is that the damper assembly acts in series with the existing damper, and at larger displacements, after the travel limits are engaged, is dynamically relatively rigid.

Other features and advantages of the present invention will be readily appreciated, as the same becomes better understood, after reading the subsequent description taken in conjunction with the accompanying drawings.

DESCRIPTION OF THE PREFERRED EMBODIMENT

Figure 1:
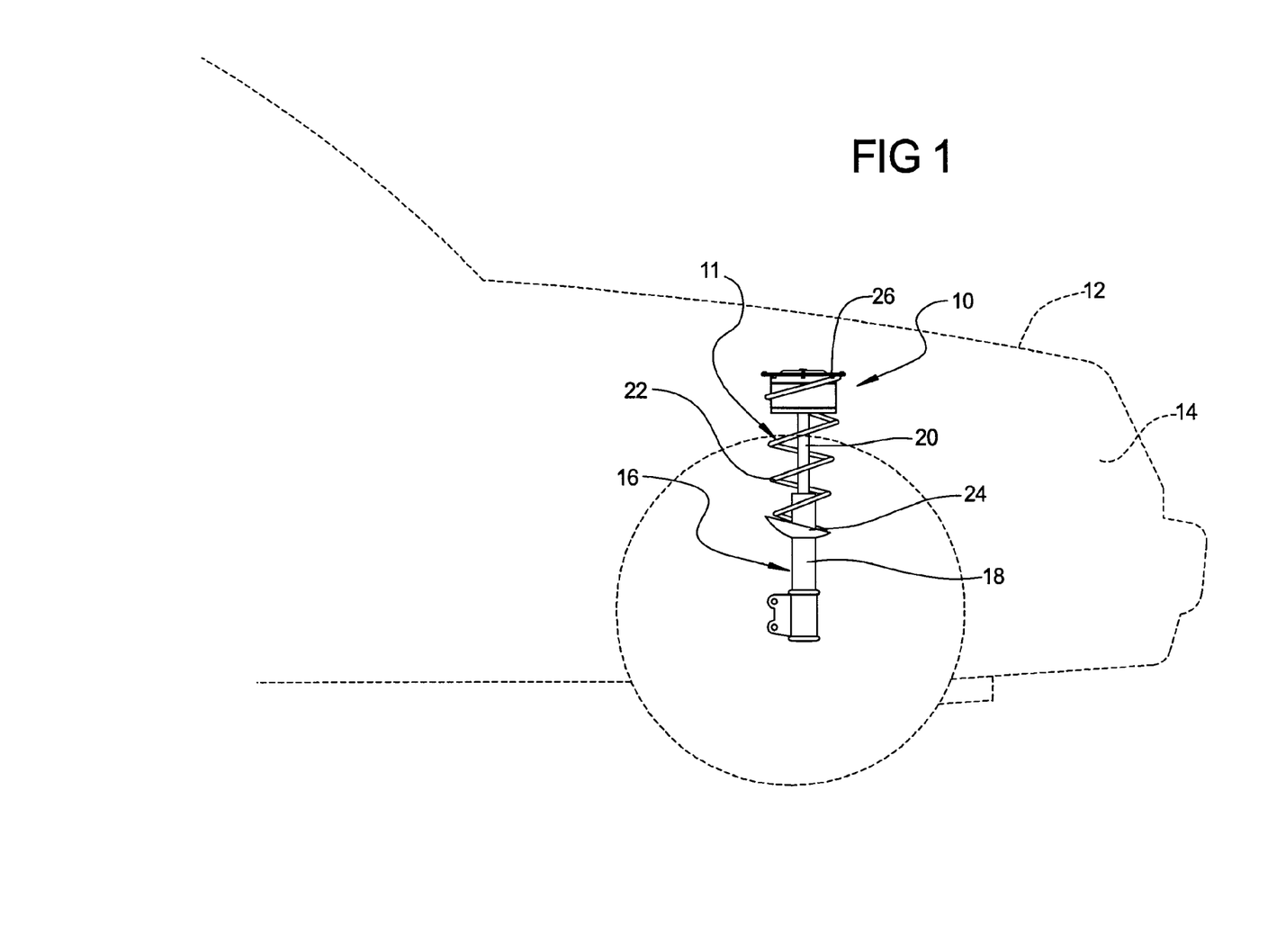
FIG. 1 is an elevational view of a damper assembly, according to the present invention, illustrated in operational relationship with a vehicle.
Figure 2:
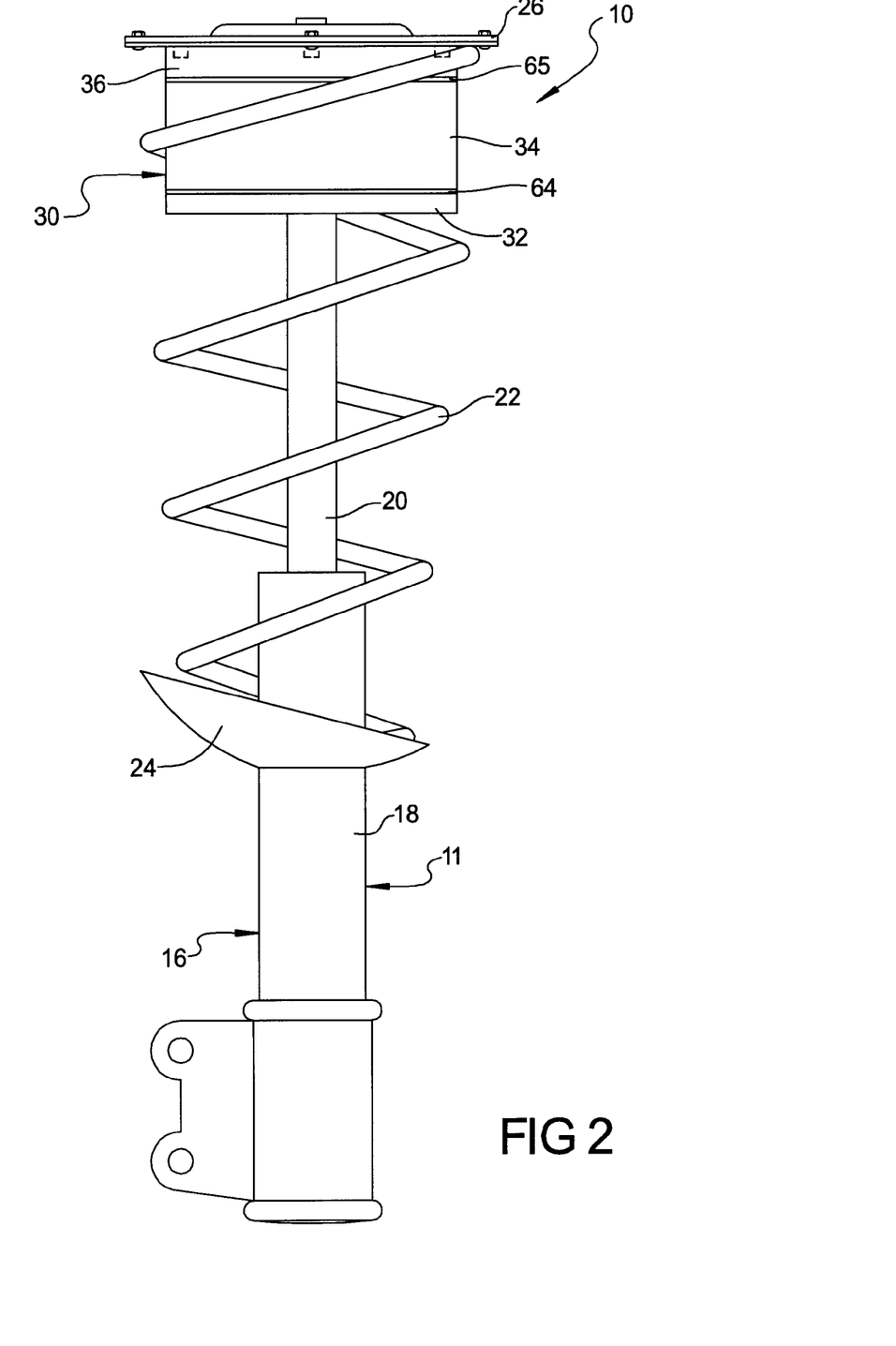
FIG. 2 is an enlarged elevational view of the damper assembly of FIG. 1.

Referring to the drawings and in particular FIGS. 1 and 2, one embodiment of a damper assembly 10, according to the present invention, is shown for a suspension system, generally indicated at 11, of a vehicle 12 (partially shown). The vehicle 12 has a vehicle body 14 mounted on or integral with a vehicle chassis (not shown). It should be appreciated that the suspension system 11 is operatively connected between an unsprung portion, hereinafter referred to as unsprung mass and a sprung portion or vehicle chassis (not shown) of the vehicle 12.

The suspension system 11 includes a strut, generally indicated at 16, mounted between the unsprung mass (not shown) and the vehicle body 14 of the vehicle 12. The strut 16 includes a hydraulic cylinder 18 with an attached piston (not shown) and piston rod 20. The hydraulic cylinder 18 is attached to the vehicle chassis at its lower end by a suitable mechanism such as fasteners (not shown). The piston rod 20 slidably extends from the piston through an upper end of the hydraulic cylinder 18 and is connected to the damper assembly 10, which is, in turn, connected to the vehicle body 14. The strut 16 also includes a coil spring 22 disposed about a portion of the hydraulic cylinder 18 between a lower spring seat 24 attached to the hydraulic cylinder 18 and an upper spring seat 26 attached to the damper assembly 10. It should be appreciated that the impact of shocks from a road surface causes movement of the piston which, in turn, displaces fluid contained in the hydraulic cylinder 18. It should also be appreciated that, except for the damper assembly 10, the suspension system 11 is conventional and known in the art.

Figure 3:
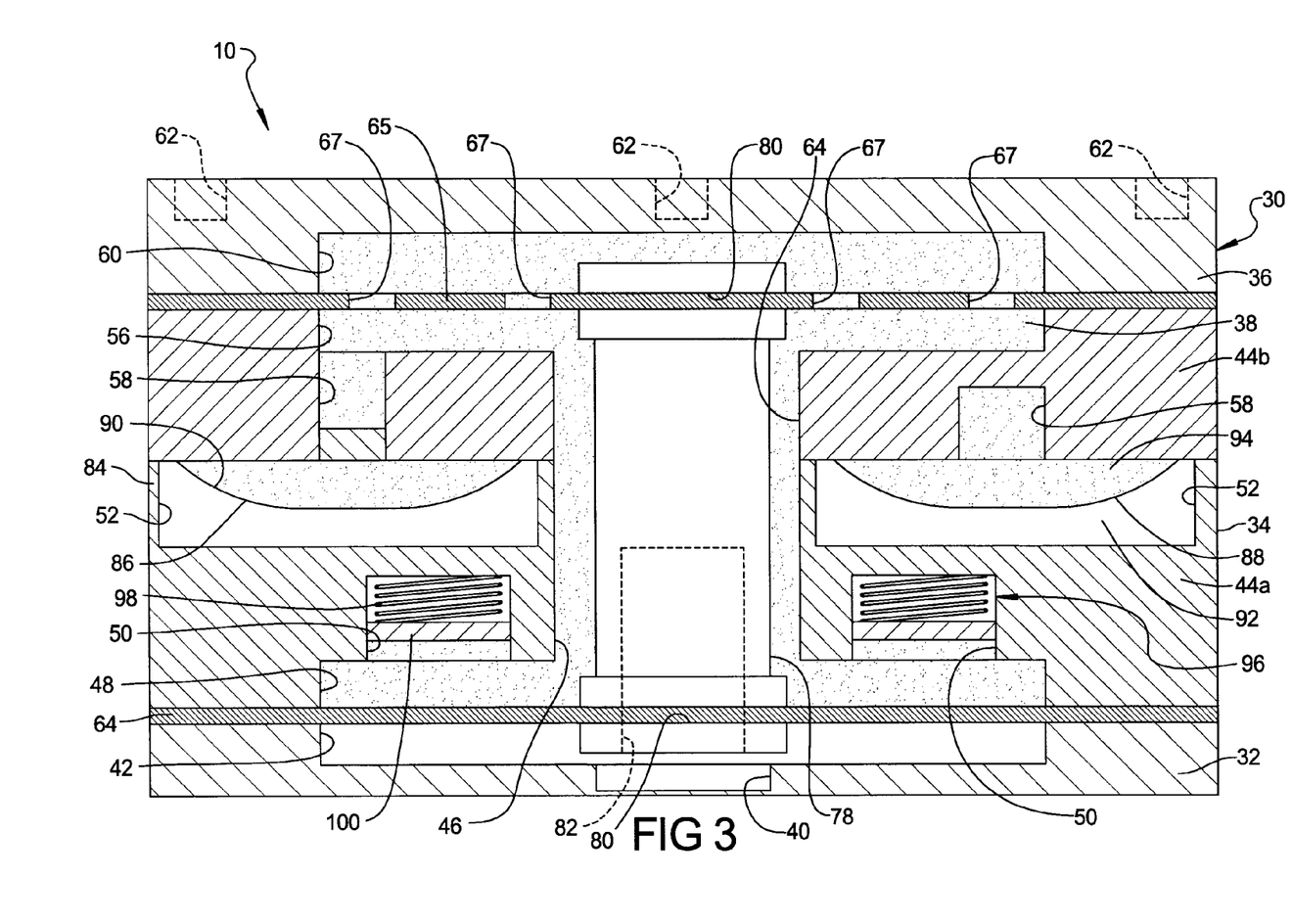
FIG. 3 is an enlarged fragmentary view of a portion of the damper assembly of FIG. 1.

Referring to FIGS. 2 and 3, the damper assembly 10 includes a housing, generally indicated at 30. The housing 30 has a bottom member 32, a side member 34, and a top member 36 to form a chamber 38 therein. The bottom member 32 is generally annular and "U" shaped in cross-section. The bottom member 32 has a centrally located aperture 40 extending therethrough to allow the piston rod 20 to extend therein. The bottom member 32 also has an enlarged cavity 42 extending therein and communicating with the aperture 40. The bottom member 32 further has a plurality of threaded apertures (not shown) extending axially therein and spaced circumferentially thereabout. The bottom member 32 is made of a metal material. The bottom member 32 is a monolithic structure being integral, unitary, and one-piece.

The side member 34 is generally annular. The side member 34 has a first or lower member 44a extending axially and a second or upper member 44b extending axially and disposed adjacent the lower member 44a. The lower member 44a has a centrally located aperture 46 extending radially therethrough to form a portion of the chamber 38. The lower member 44a also has an enlarged central cavity 48 extending therein that communicates with the aperture 46 and forms a portion of the chamber 38. The lower member 44a has at least one, preferably a plurality of first cavities 50 extending from a lower portion therein and spaced radially from the aperture 46 and communicating with the central cavity 48 for a function to be described. The lower member 44a has at least one second cavity 52 extending from an upper portion therein for a function to be described. The lower member 44a may include a plurality of apertures (not shown) extending axially therethrough and spaced circumferentially thereabout. The lower member 44a is made of a metal material.

The upper member 44b has a centrally located aperture 54 extending radially therethrough to form a portion of the chamber 38. The upper member 44b also has an enlarged central cavity 56 extending therein that communicates with the aperture 54 and forms a portion of the chamber 38. The upper member 44b has at least one passageway 58 extending therein and communicating with the central cavity 56 and the second cavity 52 for a function to be described. The upper member 44b may include a plurality of apertures (not shown) extending axially therethrough and spaced circumferentially thereabout. The upper member 44b is made of a metal material.

The top member 36 is generally annular and "U" shaped in cross-section. The top member 36 has an enlarged cavity 60 extending therein. The top member 36 has a plurality of apertures 62 extending axially therein and spaced circumferentially thereabout. The top member 36 is made of a metal material. The top member 36 is a monolithic structure being integral, unitary, and one-piece.

The housing 30 further includes a plurality of fasteners (not shown) to secure the bottom member 32, side member 34, and top member 36 together. The fasteners are bolts that extend through the apertures and threadably engage the threaded apertures. It should be appreciated that either the bottom member 32 or top member 36 has threaded apertures to allow the fasteners to connect and secure the bottom member 32, side member 34, and top member 36 together. It should also be appreciated that fasteners (not shown) may attach the housing 30 to the vehicle body 14.

Figure 4:
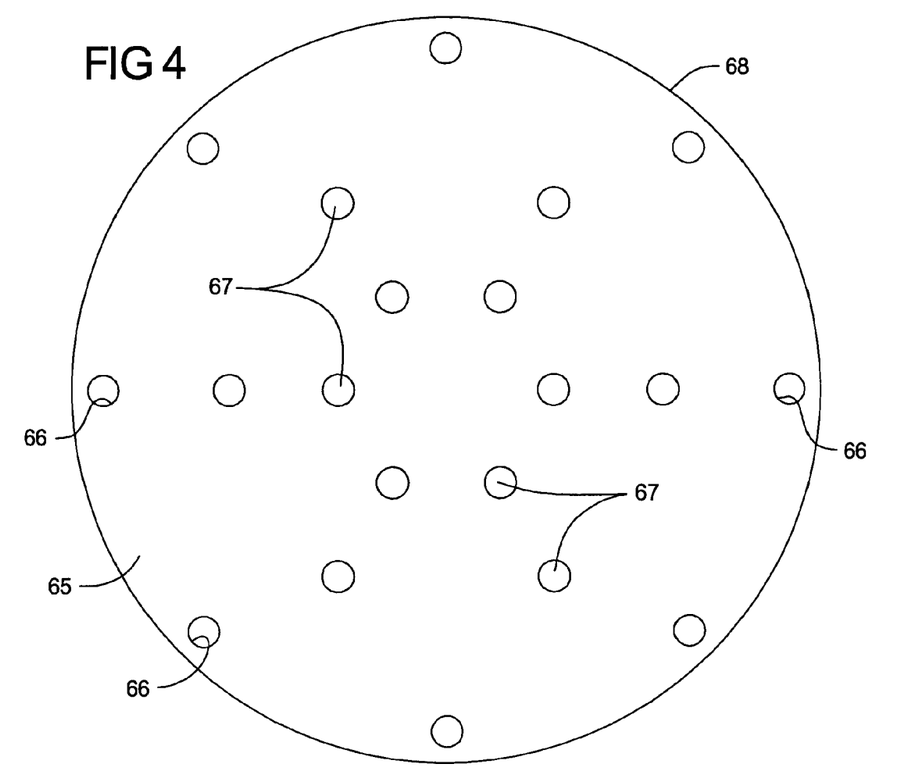
FIG. 4 is a plan view of a portion of the damper assembly of FIG. 1.

Referring to FIGS. 2 through 4, the damper assembly 10 includes at least one, preferably a plurality of diaphragms 64 and 65 extending across a portion of the chamber 38 of the housing 30. The diaphragms 64 and 65 are generally circular in shape. The lower diaphragm 64 is solid. The upper diaphragm 65 includes a plurality of apertures 66 extending axially therethrough. The apertures 66 are spaced circumferentially from each other and allow the fasteners to extend therethrough. The upper diaphragm 65 also includes at least one, preferably a plurality of apertures 67 spaced radially and extending axially therethrough to allow fluid flow. The diaphragms 64 and 65 are made of a metal material. Each of the diaphragms 64 and 65 is a monolithic structure being integral, unitary, and one piece.

As illustrated in FIG. 2, the lower diaphragm 64 is disposed between the bottom member 32 and the lower member 44a of the side member 34 and extends radially across a portion of the chamber 38. The upper diaphragm 65 is disposed between the top member 36 and the upper member 44b of the side member 34 and extends radially across a portion of the chamber 38. The fasteners (not shown) extend through the apertures 66. It should be appreciated that the diaphragms 64 and 65 are relatively thin and corrugated flexures for compliant axial freedom and stiff radial reaction.

Referring to FIG. 3, the damper assembly 10 includes a central member 78 connecting the diaphragms 64 and 65 at their centers providing a mechanism for attaching the piston rod 20 to the diaphragms 64 and 65. The central member 78 is generally cylindrical in shape with a generally circular cross-sectional shape. The central member 78 is preferably a multiple piece member forming spaces 80 for the diaphragms 64 and 65. The central member 78 has a threaded cavity 82 extending axially therein to receive a threaded portion of the piston rod 20. The central member 78 is made of a rigid material. The central member 78 is disposed within the chamber 38 of the housing 30 and threadably engages the piston rod 20. It should be appreciated that the diaphragms 64 and 65 are spaced to react to sizable moments and to react to sideload and bending moments.

In one embodiment, the damper assembly 10 includes a fluid collector 84 for collecting hydraulic fluid. The fluid collector 84 includes the second cavities 52 of the lower member 44a and the passageways 58 of the upper member 44b of the side member 34 of the housing 30. The fluid collector 84 also includes a membrane 86 disposed in each of the second cavities 52 to separate the interior thereof into a first chamber 88 and a second chamber 90. The first chamber 88 is either filled with a gas 92 such as nitrogen or vented to atmosphere and the second chamber 90 is filled with a liquid fluid 94 such as hydraulic fluid. The passageways 58 extend between the chamber 38 and the second chamber 90 for the fluid 94 to pass between the second chamber 90 and the chamber 38. It should be appreciated that the passageways 58 have a tunable geometry by changing the cross-sectional area and length of the passageways 58.

In one embodiment, the damper assembly 10 may include at least one supplemental volume dilation stiffness assembly, generally indicated at 96. Preferably, the supplemental volume dilation stiffness assembly 96 includes the first cavities 50 of the lower member 44*a*. The supplemental volume dilation stiffness assembly 96 also includes an elastic member such as a spring 98 disposed in each of the first cavities 50 and a movable element such as a piston 100 disposed adjacent the spring 98 such that the spring 98 is disposed between the piston 100 and the axial end of the first cavity 50. It should be appreciated that hydraulic fluid 94 from the chamber 38 exerts pressure against the piston 100 to compress the spring 98 based on movement of the diaphragms 64 and 65. It should also be appreciated that the elastic member may be rubber plug or equivalent to provide elasticity.

In operation of the damper assembly 10, the damper assembly 10 is disposed in series with the strut 16. For low amplitude dynamic displacements, the damper assembly 10 deflects and provides the required damping. For example, the piston rod 20, diaphragms 64 and 65, and central member 78 move or deflect upwardly as a unit and displace fluid that flows from chambers 38 and 60, through passage 58, and into the second chamber 90 of the fluid collector 84. When the piston rod 20, diaphragms 64 and 65, and central member 78 move or deflect downwardly as a unit, the displaced fluid flows from the second chamber 90 of the fluid collector 84, through the passage 58 and apertures 67, and into the chambers 38 and 60.

At larger displacements, after travel limits are engaged, the damper assembly 10 is relatively rigid and the strut 16 deflects, resulting in displaced fluid within the strut 16. In one embodiment, the damper assembly 10 has highly compliant axial freedom such as approximately 5 µm/N to approximately 10 µm/N for displacements less than 1 mm, damping at approximately 1 N-sec/mm to approximately 2 N-sec/mm for displacements less than 1 mm, and becomes relatively stiff such as greater than 2000 N/mm for amplitudes greater than 1 mm.

Figure 5:
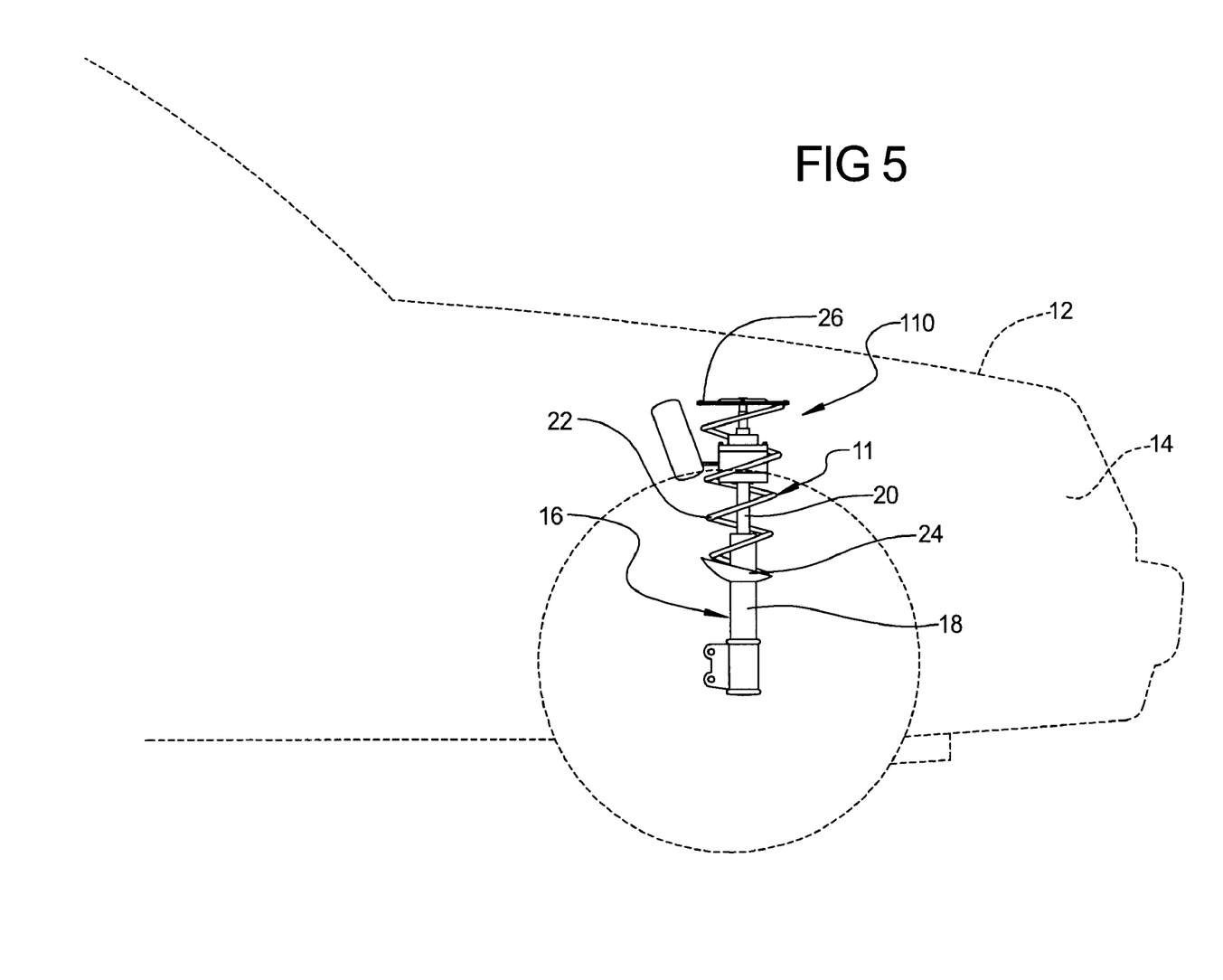
FIG. 5 is an elevational view of another embodiment, according to the present invention, of the damper assembly of FIG. 1 illustrated in operational relationship with a vehicle.
Figure 6:
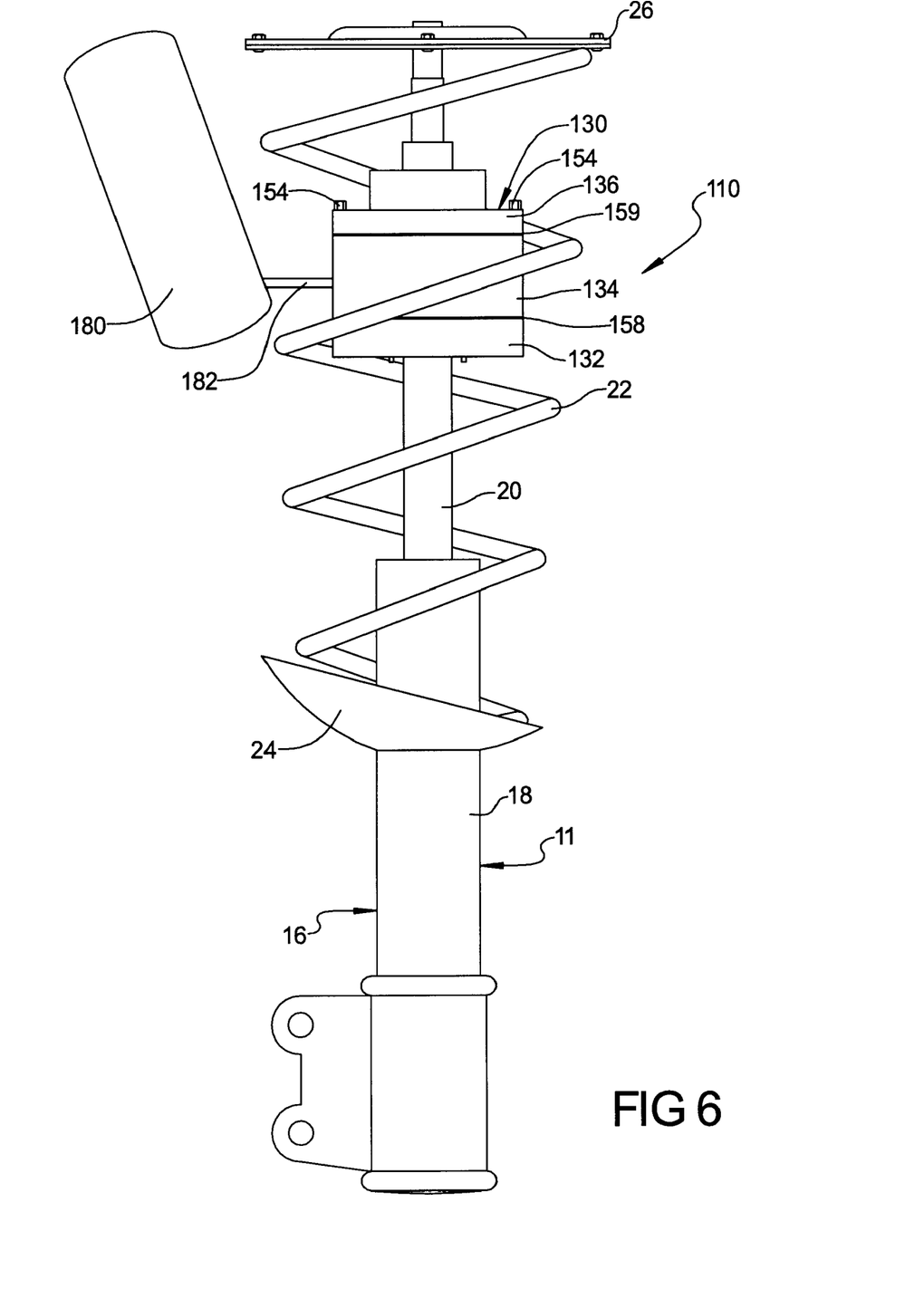
FIG. 6 is an enlarged elevational view of the damper assembly of FIG. 5.

Referring to FIGS. 5 and 6, another embodiment 110, according to the present invention, of the damper assembly 10 is shown for the suspension system 11 of the vehicle 12, previously described. The vehicle 12 includes the vehicle body 14 and the suspension system 11. The suspension system 11 includes the strut 16. The strut 16 includes the hydraulic cylinder 18 with an attached piston (not shown) and the piston rod 20. The piston rod 20 slidably extends from the piston through an upper end of the hydraulic cylinder 18 and is connected to the damper assembly 110, which is, in turn, connected to the vehicle body 14. The strut 16 also includes the coil spring 22 disposed about a portion of the hydraulic cylinder 18 between the lower spring seat 24 attached to the hydraulic cylinder 18 and the upper spring seat 26 attached to the piston rod 20. It should be appreciated that, except for the damper assembly 110, the suspension system 11 is conventional and known in the art.

Figure 7:
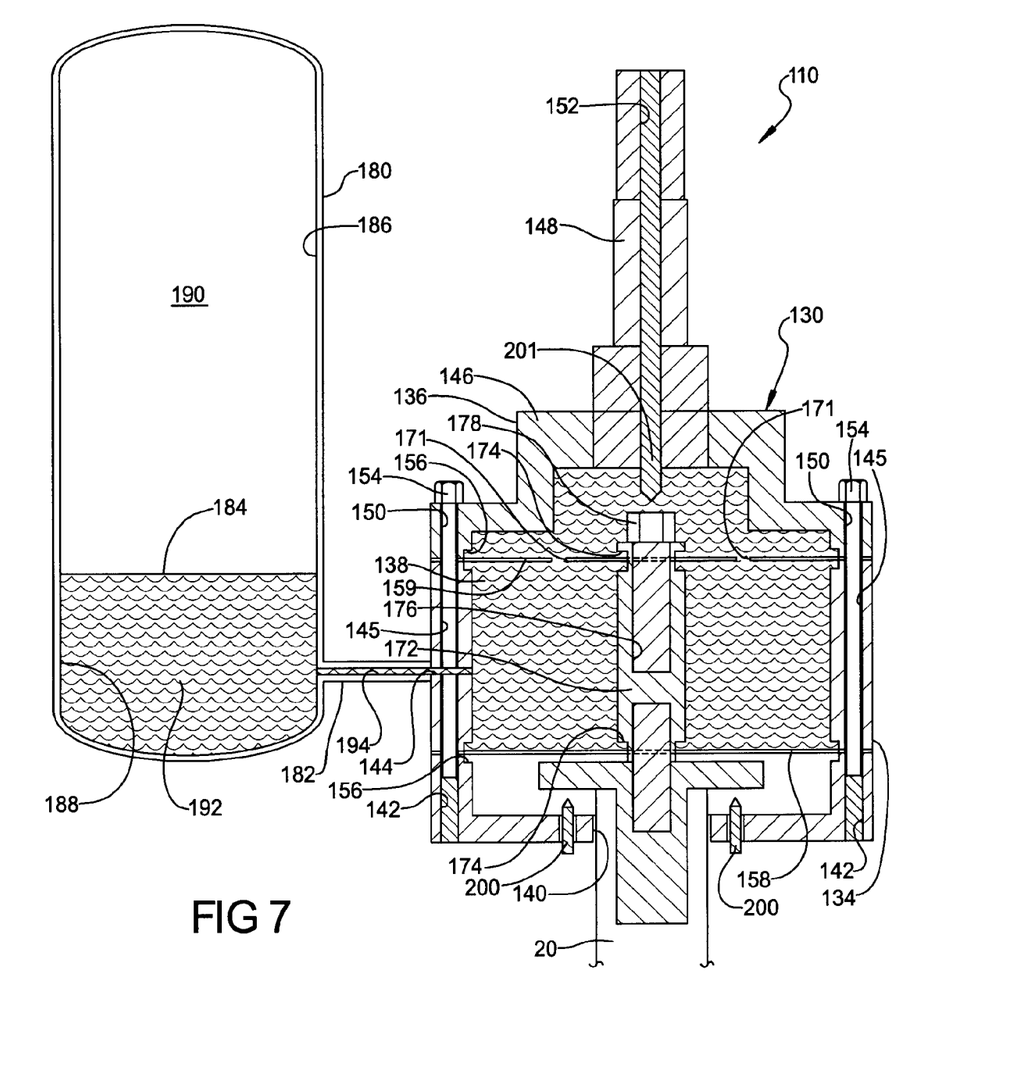
FIG. 7 is an enlarged fragmentary view of a portion of the damper assembly of FIG. 5.

Referring to FIGS. 6 and 7, the damper assembly 110 includes a housing, generally indicated at 130. The housing 130 has a bottom member 132, a side member 134, and a top member 136 to form a chamber 138 therein. The bottom member 132 is generally annular and "U" shaped in cross-section. The bottom member 132 has a centrally located aperture 140 extending therethrough to allow the piston rod 20 to extend therein. The bottom member 132 also has a plurality of threaded apertures 142 extending axially therein and spaced circumferentially thereabout. The bottom member 132 is made of a metal material.

The side member 134 is generally annular. The side member 134 has an aperture 144 extending radially therein to communicate with the chamber 138. The side member 134 also has a plurality of apertures 145 extending axially therethrough and spaced circumferentially thereabout. The side member 134 is made of a metal material.

The top member 136 has a base portion 146 and a shaft portion 148 extending axially from the base portion 146. The base portion 146 is generally annular and stair-stepped in cross-section. The base portion 146 has a plurality of apertures 150 extending axially therethrough and spaced circumferentially thereabout. The shaft portion 148 is generally cylindrical in shape with a generally circular cross-sectional shape. The shaft portion 148 has a diameter less than a diameter of the base portion 146. The shaft portion 148 has a threaded aperture 152 extending axially therethrough. The top member 136 is made of a metal material. The top member 136 is a monolithic structure being integral, unitary and one-piece.

The housing 130 further includes a plurality of fasteners 154 to secure the bottom member 132, side member 134, and top member 136 together. The fasteners 154 are bolts that extend through the apertures 150 and 145 and threadably engage the threaded apertures 142. The housing 130 includes a plurality of notches 156 extending radially therein at the juncture of the bottom member 132, side member 134, and top member 136. The notches 156 are annular and generally rectangular in cross-section.

Figure 8:
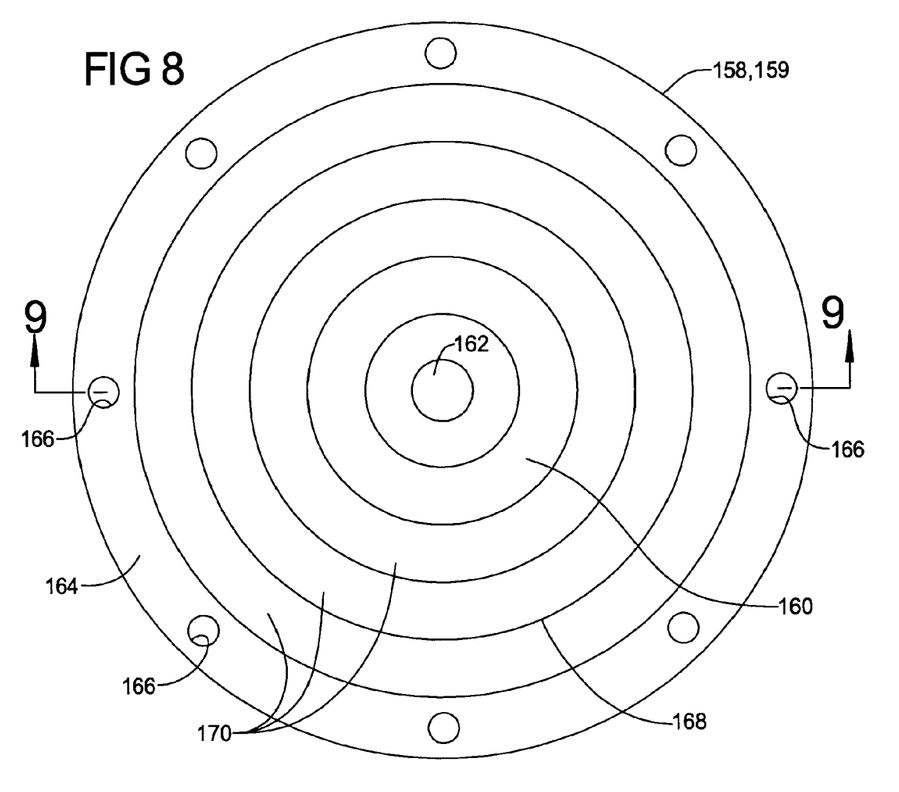
FIG. 8 is a plan view of a portion of the damper assembly of FIG. 5.
Figure 9:
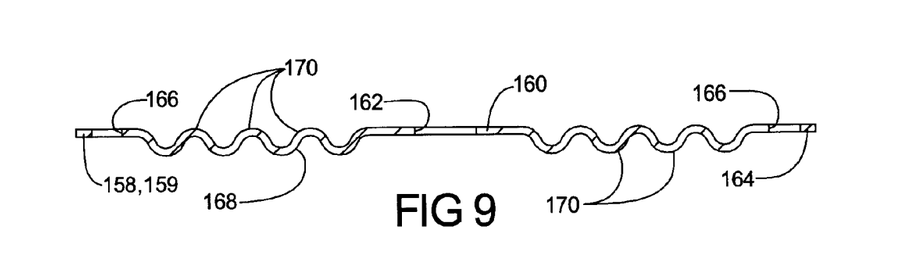
FIG. 9 is a sectional view taken along line 9-9 of FIG. 8.

Referring to FIGS. 7 through 9, the damper assembly 110 includes at least one, preferably a plurality of diaphragms 158 and 159 extending across the chamber 138 of the housing 130. The diaphragms 158 and 159 are generally circular in shape. Each of the diaphragms 158 and 159 include a central portion 160 having an aperture 162 extending axially therethrough. Each of the diaphragms 158 and 159 include an edge portion 164 spaced radially from the central portion 160 and having a plurality of apertures 166 extending axially therethrough. The apertures 166 are spaced circumferentially from each other and allow the fasteners 154 to extend therethrough. Each of the diaphragms 158 and 159 includes a corrugated portion 168 disposed radially between the central portion 160 and the edge portion 164. The corrugated portion 168 includes at least one, preferably a plurality of corrugations 170. The corrugations 170 are annular and extend axially in both directions. The upper diaphragm 159 also includes at least one, preferably a plurality of apertures 171 (FIG. 7) extending axially therethrough to allow fluid flow. The diaphragms 158 and 159 are made of a metal material. Each of the diaphragms 158 and 159 is a monolithic structure being integral, unitary, and one piece.

As illustrated in FIGS. 6 and 7, the lower diaphragm 158 is disposed between the bottom member 132 and the side member 134 and extends radially across the chamber 138. The upper diaphragm 159 is disposed between the top member 136 and the side member 134 and extends radially across the chamber 138. The fasteners 154 extend through the apertures 166 in the edge portion 164. It should be appreciated that the diaphragms 158 and 159 are located in the notches 156 and their axial movement is limited by the upper and lower travel limiters 200 and 201. It should also be appreciated that the diaphragms 158 and 159 are relatively thin and corrugated flexures for compliant axial freedom and stiff radial reaction.

Referring to FIG. 7, the damper assembly 110 includes a central member 172 connecting the diaphragms 158 and 159 at their centers providing a mechanism for attaching the piston rod 20 to the diaphragms 158 and 159. The central member 172 is generally cylindrical in shape with a generally circular cross-sectional shape. The central member 172 has a plurality of annular grooves 174 extending radially therein and spaced axially from each other. The central member 172 has an aperture 176 extending axially therethrough. The central member 172 is made of a rigid material. The central member 172 is disposed within the chamber 138 of the housing 130 and secured therein by a suitable mechanism such as a fastener 178 extending into the aperture 176 and threadably engaging the piston rod 20. It should be appreciated that the central member 172 extends through the aperture 162 in the central portion 160 of the diaphragms 158 and 159. It should also be appreciated that the diaphragms 158 and 159 are spaced to react to sizable moments and to react to sideload and bending moments.

In one embodiment, the damper assembly 110 includes a storage reservoir 180 for storing hydraulic fluid and a conduit 182 extending between the storage reservoir 180 and the side member 134 of the housing 130. The storage reservoir 180 may include an optional membrane 184 disposed therein to separate the interior into a first chamber 186 and a second chamber 188. The first chamber 186 is either vented to atmosphere or filled with a gas 190 such as nitrogen and the second chamber 188 is filled with a liquid fluid 192 such as hydraulic fluid. The conduit 182 has a passageway 194 extending therein for the fluid 192 to pass from the second chamber 188 through the aperture 144 in the side member 134 and into the chamber 138 of the housing 130. It should be appreciated that the passageway 194 has a tunable geometry by changing the cross-sectional area and length of the passageway 194.

In operation of the damper assembly 110, the damper assembly 110 is disposed in series with the strut 16. For low amplitude dynamic displacements, the damper assembly 110 deflects and provides the required damping. For example, the piston rod 20, diaphragms 158 and 159, and central member 172 move or deflect upwardly as a unit and displace fluid that flows through the apertures 171 in the upper diaphragm 159 and from the chamber 138, through the passages 144 and 194, and into the second chamber 188 of the storage reservoir 180. When the piston rod 20, diaphragms 158 and 159, and central member 172 move or deflect downwardly as a unit, the displaced fluid flows from the second chamber 188 of the storage reservoir 180, through the passages 194 and 144, into the chamber 138, and through the apertures 171 in the upper diaphragm 159.

At larger displacements, after the travel limits of the diaphragms 158 and 159 are engaged, the damper assembly 110 is relatively rigid and the strut 16 deflects, resulting in displaced fluid within the strut 16. In one embodiment, the damper assembly 110 has highly compliant axial freedom such as approximately 5 em/N to approximately 10 µm/N for displacements less than 1 mm, damping at approximately 1 N-sec/mm to approximately 2 N-sec/mm for displacements less than 1 mm, and becomes relatively stiff such as greater than 2000 N/mm for amplitudes greater than 1 mm.

The present invention has been described in an illustrative manner. It is to be understood that the terminology, which has been used, is intended to be in the nature of words of description rather than of limitation.

Many modifications and variations of the present invention are possible in light of the above teachings. Therefore, within the scope of the appended claims, the present invention may be practiced other than as specifically described.

The invention claimed is:

1. A damper assembly for a suspension system of a vehicle comprising:
   a housing adapted to be mounted to one end of a strut in the suspension system, said housing having a chamber with fluid therein; and
   a plurality of diaphragms extending across said chamber to react with said fluid, to be compliant at relatively small displacements, and to be rigid at relatively large displacements, one of said diaphragms being a lower diaphragm and another of said diaphragms being an upper diaphragm having at least one aperture extending therethrough to allow fluid flow.

2. A damper assembly as set forth in claim 1 wherein at least one of said diaphragms comprises a center portion extending radially, a corrugated portion extending radially from said base portion, and an edge portion extending radially from said corrugated portion.

3. A damper assembly as set forth in claim 1 including a central member disposed within said housing and connected to at least one of said diaphragms in said chamber and for connection to a rod.

4. A damper assembly as set forth in claim 1 including at least one fluid collector disposed within said housing and communicating with said chamber.

5. A damper assembly as set forth in claim 1 including at least one supplemental volume dilation assembly disposed within said housing and communicating with said chamber.

6. A damper assembly as set forth in claim 1 including a reservoir to supply fluid to said chamber.

7. A damper assembly as set forth in claim 6 including a conduit extending between said reservoir and said housing and having a passageway extending therethrough to allow fluid flow between said reservoir and said chamber.

8. A damper assembly as set forth in claim 7 wherein said passageway has a tunable geometry.

9. A damper assembly for a suspension system of a vehicle comprising:
   a housing adapted to be mounted to one end of a strut in the suspension system, said housing having a chamber with fluid therein;
   at least one diaphragm extending across said chamber to react with said fluid, to be compliant at relatively small displacements, and to be rigid at relatively large displacements;
   at least one fluid collector disposed within said housing and communicating with said chamber; and
   wherein said at least one fluid collector comprises a cavity, a membrane disposed in said cavity, and a passage communicating with said cavity and said chamber.

10. A damper assembly for a suspension system of a vehicle comprising:
    a housing adapted to be mounted to one end of a strut in the suspension system, said housing having a chamber with fluid therein;
    at least one diaphragm extending across said chamber to react with said fluid, to be compliant at relatively small displacements, and to be rigid at relatively large displacements;
    at least one supplemental volume dilation assembly disposed within said housing and communicating with said chamber; and
    wherein said at least one supplemental volume dilation assembly comprises a cavity, an elastic member disposed in said cavity, and a movable element disposed in said cavity and adjacent said elastic member.

11. A suspension system of a vehicle comprising:
    a strut having a lower end adapted to be mounted to an unsprung mass of the vehicle; and
    a damper assembly connected in series with said strut and adapted to be mounted to a body of the vehicle, said damper assembly comprising a housing having a chamber therein and a plurality of diaphragms extending across said chamber and one of said diaphragms being a lower diaphragm and another of said diaphragms being an upper diaphragm having at least one aperture extending therethrough to allow fluid flow; and wherein said strut has a hydraulic cylinder adapted to be mounted to the unsprung mass and a piston rod extending from said hydraulic cylinder and connected to said damper assembly.

12. A suspension system of a vehicle comprising:

a strut having a lower end adapted to be mounted to an unsprung mass of the vehicle;

a damper assembly connected in series with said strut and adapted to be mounted to a body of the vehicle;

wherein said damper assembly comprises a housing having a chamber therein and a plurality of diaphragms extending across said chamber; and wherein each of said diaphragms comprises a center portion extending radially, a corrugated portion extending radially from said base portion, and an edge portion extending radially from said corrugated portion.

13. A suspension system of a vehicle comprising:

a strut having a lower end adapted to be mounted to an unsprung mass of the vehicle;

a damper assembly connected in series with said strut and adapted to be mounted to a body of the vehicle;

wherein said damper assembly comprises a housing having a chamber therein and a plurality of diaphragms extending across said chamber;

wherein said strut has a hydraulic cylinder adapted to be mounted to the unsprung mass and a piston rod extending from said hydraulic cylinder and connected to said damper assembly; and a central member disposed within said housing and connected to said diaphragms and connected to said piston rod.

* * * * *